United States Patent [19]

Wamsley, Jr.

[11] Patent Number: 4,668,254

[45] Date of Patent: May 26, 1987

[54] GAS/LIQUID/SOLIDS SEPARATOR

[76] Inventor: Robert H. Wamsley, Jr., 7755 Praver Dr. East, Jacksonville, Fla. 32217

[21] Appl. No.: 840,217

[22] Filed: Mar. 17, 1986

[51] Int. Cl.$^4$ ............................................. B01D 50/00
[52] U.S. Cl. ........................................ 55/216; 55/274;
 55/310; 55/325; 55/329; 55/357; 55/417;
 55/433; 55/DIG. 30
[58] Field of Search ................. 55/216, 219, 325, 329,
 55/332, 320, DIG. 30, 274, 310, 417–420, 428,
 433, 357; 60/309, 311

[56] References Cited

U.S. PATENT DOCUMENTS

| | | | |
|---|---|---|---|
| 386,173 | 7/1888 | White | 55/216 |
| 459,498 | 9/1891 | Longwell | 55/216 X |
| 492,083 | 2/1893 | Wright | 55/216 |
| 973,775 | 10/1910 | Goodrich, Jr. | 55/332 X |
| 1,017,900 | 2/1912 | Phillips | 55/DIG. 30 X |
| 1,335,602 | 3/1920 | Pradairol | 55/219 |
| 1,461,045 | 7/1923 | Paasche | 55/325 X |
| 1,606,032 | 11/1926 | Kolstrand | 55/DIG. 30 X |
| 2,538,450 | 1/1951 | Gardner | 55/DIG. 30 X |
| 2,555,452 | 6/1951 | McIntyre | 55/216 |
| 2,643,732 | 6/1953 | Keen | 55/216 |
| 2,686,399 | 8/1954 | Stoltz | 55/DIG. 30 X |
| 2,710,666 | 6/1955 | May | 55/216 |
| 2,745,646 | 5/1956 | Stoltz | 55/DIG. 30 X |
| 2,777,536 | 1/1957 | Thomas et al. | 55/DIG. 30 X |
| 3,735,567 | 5/1973 | Viers | 55/DIG. 30 X |
| 3,997,303 | 12/1976 | Newton | 55/320 X |
| 4,055,405 | 10/1977 | Thun-Hohenstein | 55/216 |

FOREIGN PATENT DOCUMENTS 2256137  5/1973  Fed. Rep. of Germany ........ 55/216

Primary Examiner—Kathleen J. Prunner
Attorney, Agent, or Firm—Arthur G. Yeager

[57] ABSTRACT

The apparatus separates exhaust fumes of an internal combustion engine into gas, liquid, and solids and comprises a container having an internal wall for substantially reducing the velocity of fumes fed into the container and allows the liquid and solids to collect in the bottom thereof with the fumes then passing through a demister filter to further separate same. A liquid level sensor connects to the container and senses when a maximum level is reached. The sensor may be of a float type and also can control a spring loaded valve in the fumes inlet passageway and/or a gauge connected by vertically spaced passageways through the side of the container, the latter gauge also could include an audible or visible alarm. A valved outlet is attached to the container for forcing the collected liquid in the container therethrough by the pressure of the incoming fumes when a plate covers the gas outlet above the filter. A valved cover may be employed to accomplish the same results while returning the cleansed exhaust gas to the engine. A pivoted bar is pivotally attached to the bottom of the container to break up any solids deposited therein.

23 Claims, 7 Drawing Figures

GAS/LIQUID/SOLIDS SEPARATOR

BACKGROUND OF THE INVENTION

This invention relates to a gas/liquid/solids separator, and more particularly a separator designed to separate oil, carbon and gases in the exhaust fumes of a diesel engine. In a two cycle, ported, air-intake diesel engine, an airbox is needed to convey air to each cylinder for combustion and scavenging of each cylinder. Oil, carbon, and sometimes water, accumulate in each airbox and must be drained out to ensure trouble free operation of the engine. Pressurized air is introduced into the airbox from the blower or the turbocharger, and each airbox normally has a drain. This results in an oily waste being pushed out of the airbox through the drains, which most engine manufacturers suggest be kept fully open. Waste from these drains has in the past been ineffectively caught in buckets or cans, or has been let to flow onto the decks or into the bilges of boats, onto railroad track beds from trains, onto the highway from trucks, or onto whatever surrounding area is available for other engine applications, e.g., drill rigs, backup generator units, etc. Such pollution of the environment is totally unacceptable today, and this invention eliminates that pollution problem.

This invention provides an effective, inexpensive method and apparatus for collecting the oily engine waste and separating it into its components for proper disposal. Additionally, it allows engine operator to monitor the type and amount of materials being wasted by the engine.

It is an object of this invention to provide an efficient collection and use of the components of the exhaust fumes of an internal combustion engine. It is another object of this invention to provide an apparatus to collect oil and carbon exiting from a diesel engine and provide for an appropriate means of disposal for such components. Still other objects will become apparent from the more detailed description of the invention which follows.

BRIEF DESCRIPTION OF THE INVENTION

This invention relates to an apparatus for separating gas from liquid and solid matter in the exhaust from an internal combustion engine including an enclosed container for liquid material, a top wall, a bottom wall, and a side wall and having an inlet for exhaust fumes, a first outlet for liquid, and a second outlet for gaseous material. The inlet has a passageway through the side wall and a discharge port inside the container. A means is provided to materially reduce the velocity of the exhaust fumes being discharged through the port. The first outlet includes a passageway through the side wall with a shut off valve in the passageway. The second outlet includes a passageway through the top wall and a filter means thereover to remove entrained nongaseous material from the gaseous material passing therethrough. A baffle means is positioned interiorly of the filter means to cause substantial changes in velocity and direction of the gaseous material as it leaves the container to pass through the filter means.

In other aspects a means is provided for selectively closing the passageway in the second outlet; a mechanical means adjacent the bottom wall is employed for breaking up any deposit of solid material thereon. Preferably, there is included a means for sensing the level of liquid material inside the container.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 2:
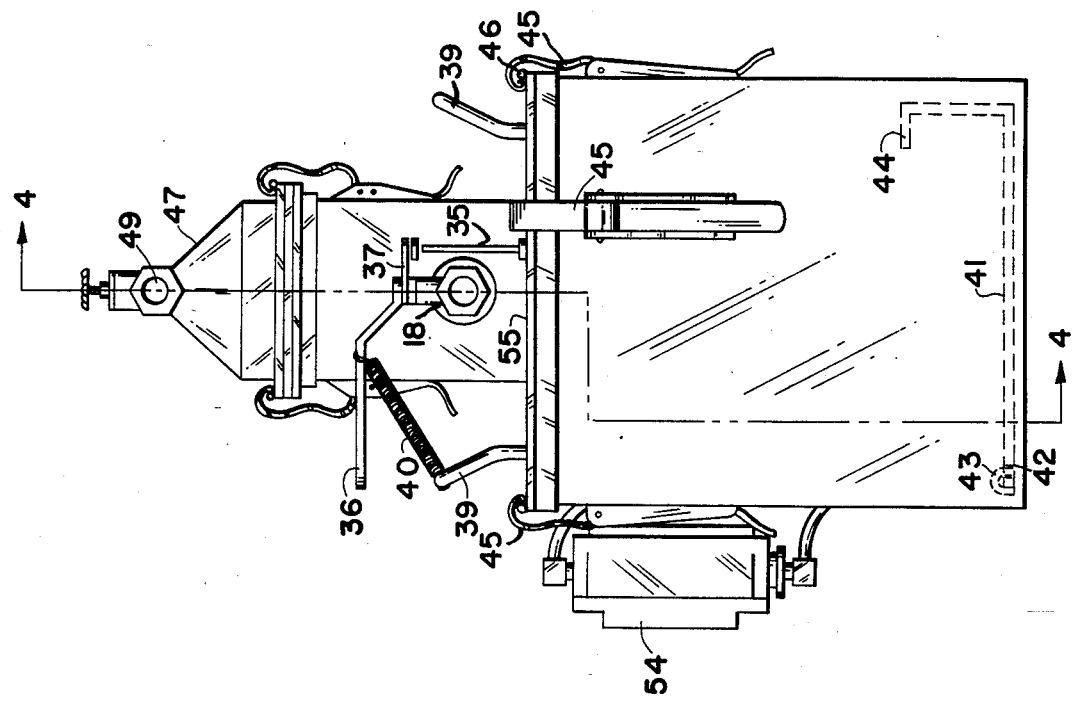
FIG. 2 is a side elevational view of the separator of this invention.

The apparatus of this invention is shown in the drawings attached to this written description. A large volume receiving tank or container 10 continuously receives exhaust fumes from an internal combustion engine through inlet pipe 16, separates the fumes into their gas, liquid, and solid components, discharges the gas component continuously through outlet 22 in top wall 11, and retains the liquid and solid components in lower chamber 15 of container 10 to be discharged periodically as needed. Liquid is discharged through outlet pipe 27. Solids are collected in the bottom of lower chamber 15 and manually removed when a sufficient build up has occurred.

Container 10 is shown in the drawings to include a smaller upper chamber 14 opening into the top of a larger lower chamber 15. This is not a necessary feature of the apparatus which can alternatively by a single chamber which is round, square, triangular or the like in cross section. A two-chamber container is preferred so it may be separated by unlocking spring closure latches 45 from engagement with lip 46 of wall 55 and lifting on handles 39 to remove the upper chamber 14 from the lower chamber 15 for cleaning purposes without disconnecting too many pipe connections. Pressure seals 56 and 57 provide tight connections between the separable chambers 14 and 15 and between chamber 14 and cover 47 to prevent any gas leakage. The material of construction may be any substance which can withstand the high temperatures and corrosive nature of exhaust fumes. Preferably, container 10 is made of metal such as steel, aluminum, brass, or of a suitable plastic material.

Inlet pipe 16 directs the incoming exhaust fumes to sudden changes, in direction and to volume changes that will greatly reduce the velocity of the fumes. This is accomplished by causing the fumes to impinge against a solid wall and then flow into a large volume container to reduce the velocity to almost zero. In the embodiment shown here pipe 16 is connected to passageway 17, a pipe nipple, which is capped at 19 where four lateral pipe nipples 20 cause the fumes to turn 90° in direction and to be reduced in velocity to about 25% of that in pipe 16. Fumes exiting from nipples 20 impinge against the solid wall of a large diameter pipe section 21 which opens into upper chamber 14. The impingement assists in removing the liquid and solid components from the gas. At the opening of pipe section 21 into chamber 14 the gas component flows generally upward toward outlet 22 while the liquid and solid components agglomerate and fall to the bottom of chamber 15 by gravity. As will be explained in greater detail below, it is preferable to include a shut off valve 18 between pipe 16 and passageway 17 outside of container 10 so that inlet 16 can be closed when desired.

Figure 5:
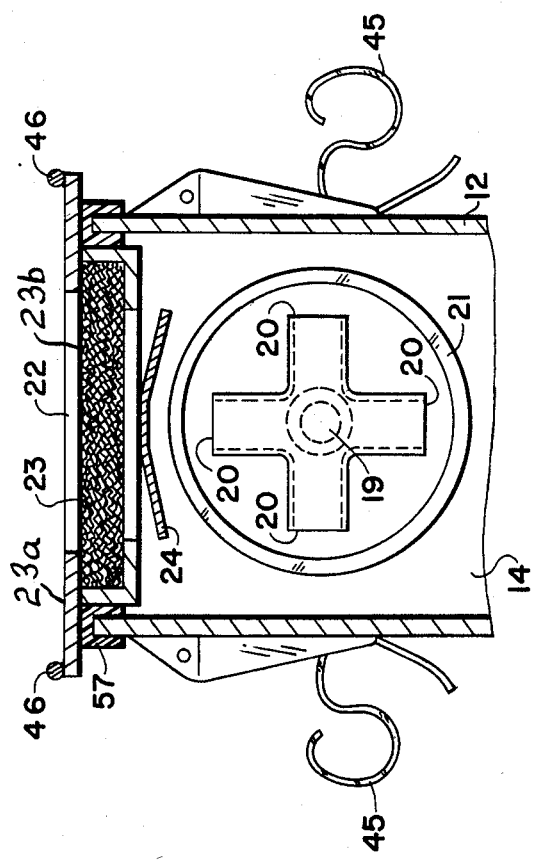
FIG. 5 is a cross sectional view taken at 5—5 of FIG. 1.

Gas leaving pipe section 21 flows upwardly to and through outlet 22 from which the gas may be returned to the engine or discharged to the atmosphere. Outlet 22 is filled with a demister filter 23 and protected on the upstream side by a baffle 24. As may be seen particularly in FIG. 5 baffle 24 functions as an impingement wall to cause the gas to change direction and remove additional droplets of liquid or solid particles. Demister filter 23 includes a generally rectangular frame 23a carrying a mass of screens and crumpled metal material 23b which provides a tortuous path for the gas to follow in leaving container 10. The demister filter is a commercially available pack which is designed to remove very small droplets of liquid entrained in the gas stream. Thus, the gas emerging from demister filter 23 is substantially free of liquid and solid materials. In different applications of this invention there may or may not be a cover over outlet 22. A preferred embodiment is to include a removable funnel shaped, pyramidal or conical cover structure 47 which leads to an outlet pipe 48 and a shut off valve 49 from which the gas could be piped to return to the engine or to be discharged at another location. If cover structure 47 is employed it is preferred to include a pressure relief valve 59 to be set to prevent any undesirable pressure build up in container 10 which would cause damage to the engine. If cover 47 is not included there should be available a flat cover plate 50 with a handle 51 permitting plate 50 to be placed over outlet 22 so as to close it completely when liquid is to be discharged from lower chamber 15 as will be described in detail below.

Liquid and solid components, generally oil and water as liquid and carbon and dirt as solid, collect by gravity in the bottom of lower chamber 15. Liquid is discharged through outlet 27 connected to passageway 25 and shut off valve 26. Passageway 25 is at a substantial elevation above bottom wall 13 of container 10 so as not to be fouled by any settled solids in the bottom of chamber 15. The interior of passageway 25 opens into a tubular space 28 lying vertically along sidewall 12, closed at top end 29 with removable plug 58 which can be removed to clean out tubular space 28 when necessary, and open at bottom end 30 spaced some distance above bottom wall 13. The spacing of open end 30 above bottom wall 13 is sufficient to provide room for a solid deposit to form and build up on bottom wall 13 to a reasonable depth but not deep enough to prevent liquid from flowing into open end 30. When liquid is to be discharged through outlet 27, valve 26 is opened and outlet 22 is closed causing exhaust fumes entering through inlet 16 to build up an internal pressure in container 10 sufficient to force liquid up tubular space 28 and be discharged through outlet 27. Outlet 22 is closed by turning valve 49 off if cover 47 is employed. If cover 47 is not employed, flat plate 50 is pressed down manually against outlet 22 and held in place until the internal pressure discharges the liquid through outlet 27.

Figure 1:
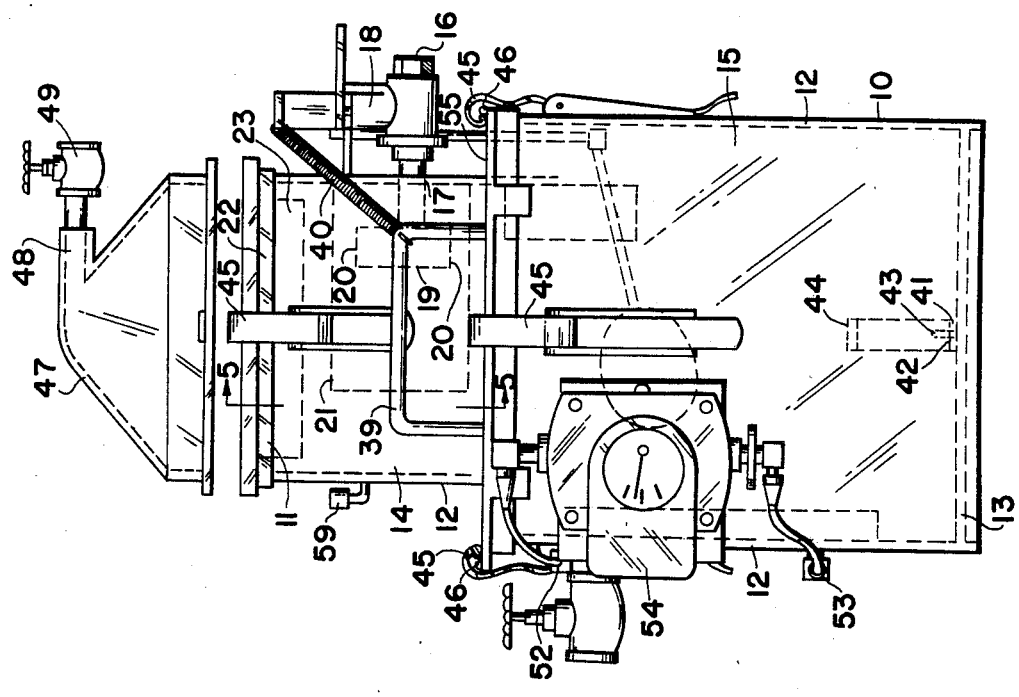
FIG. 1 is a front elevational view of the separator of this invention.
Figure 4:
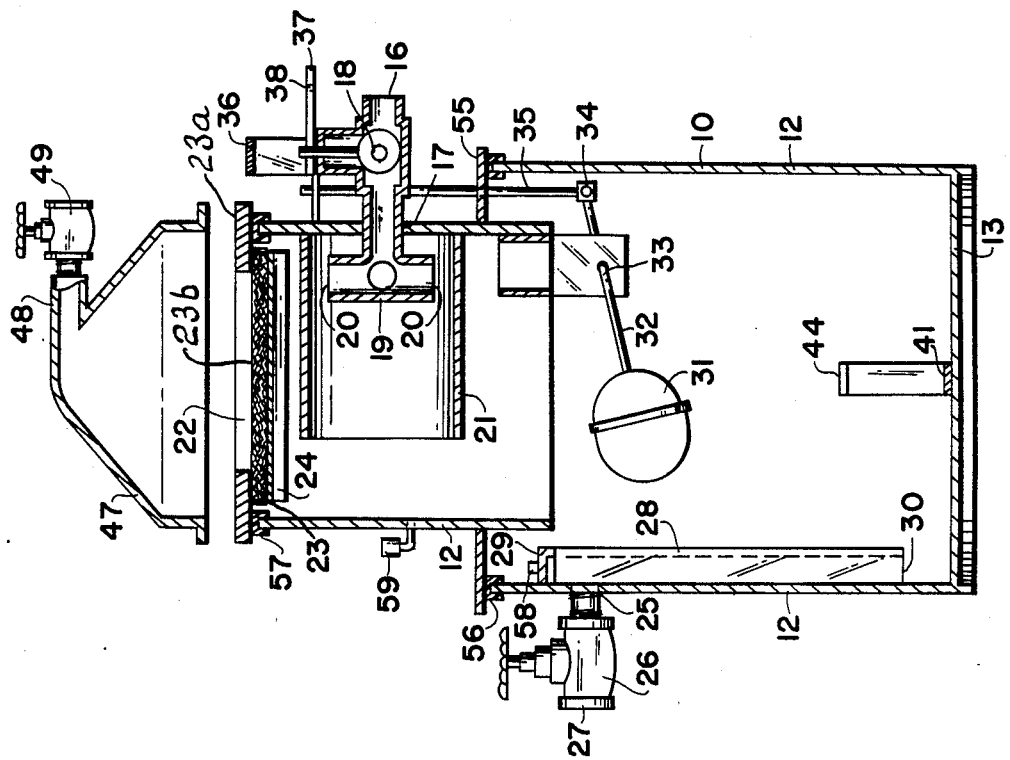
FIG. 4 is a cross sectional view taken at 4—4 of FIG. 2.
Figure 3:
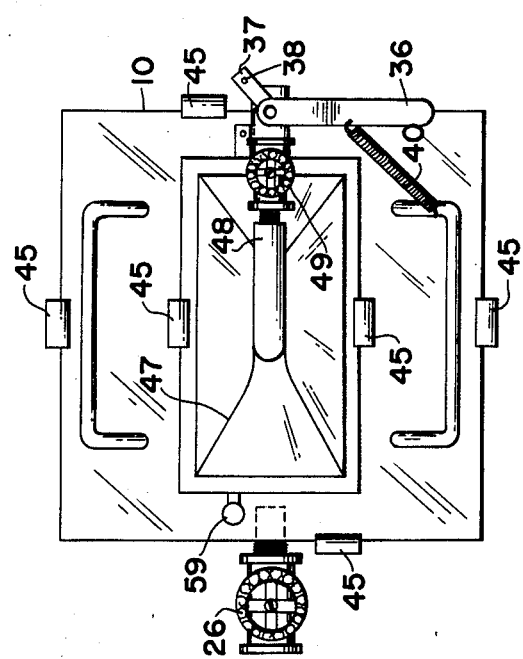
FIG. 3 is a top plan view of the separator of this invention.
Figure 6:
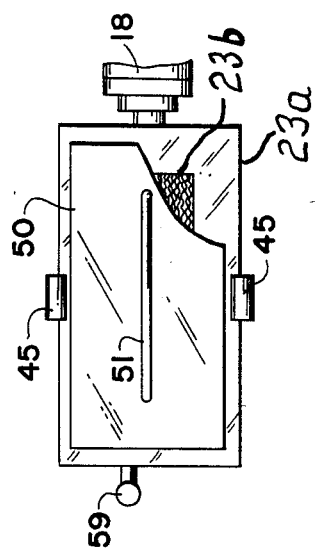
FIG. 6 is a partial view in elevation of the separator with the manual cover plate in position.
Figure 7:
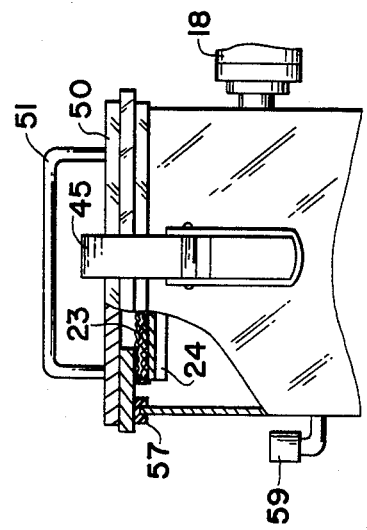
FIG. 7 is a partial top plan view of the separator as shown in FIG. 6.

The level of liquid in lower chamber 15 must be kept low enough for the separator to work properly. If the level reached that of inlet 16, the separator would not be able to function, and hence it is important to keep that level in lower chamber 15. One convenient method of sensing that level and preventing damage to the engine by reason of liquid backing up in inlet 16, is to employ a float 31 which floats on the surface of the liquid in chamber 15. Float 31 is connected to a rod 32 which is pivoted at 33 and connected at its end 34 to a vertical rod 35 which passes through wall 55 so as to be available outside of container 10. Rod 35 may be a visible gauge calibrated to provide an indication of the level of liquid inside container 10. As float 31 rises with higher and higher levels of liquid, rod 35 would show less and less of its length outside wall 55. Another arrangement is that shown here to ensure that no harm comes to the engine by a liquid level that is too high. In this arrangement the free end of rod 35 is positioned to mate with hole 38 in side arm 37 of handle 36 of valve 18. Handle 36 is biased by spring 40 to be in the position shown in FIG. 3 which is the closed position of valve 18, i.e., whereby no exhaust fumes can enter container 10 and no liquid can flow backwards from container 10 to the engine. In the operative open position, handle 36 is pivoted counterclockwise until hole 38 is directly over rod 35 and rod 35 is positioned in hole 38 to hold handle 36 in the open position. Rod 35 is at a sufficiently high elevation to keep valve 18 open so long as float 31 is at a low elevation. When the liquid level rises, causing float 31 to rise, rod 35 moves downwardly. When rod 35 moves downwardly enough to release its contact with hole 38, spring 40 pulls handle 36 to the closed position and no liquid can get into inlet 16 to cause harm to the engine. This safety measure should be supplemented by a sensing mechanism to let the operator know when to pump out the liquid so that the extreme of shutting valve 18 never occurs. Such mechanisms are available commercially and one is shown here as 54 in FIG. 1. Gauge 54 requires two vertically spaced passageways 52 and 53 through sidewall 12 representing maximum and minimum liquid levels to be sensed. The gauge 54 preferably has a sight glass or a dial to show the level at any location between passageways 52 and 53, and includes an alarm, audible or visible, to indicate that the maximum level 52 has been reached, whereupon the operator can discharge the liquid through outlet 27 to bring the liquid level back to an acceptable position.

Solid particles in the engine exhaust fumes, mostly carbon, settles out of the liquid, mostly oil and water, form a cake on bottom wall 13. The build up of this cake is much slower than the collection of liquid, and causes no problem until the cake is thick enough to interfere with the liquid discharge. Generally, the minute carbon particles will agglomerate to a hard solid layer that is not easily removed. Of course, the entire separator must be removed from service and lower chamber 15 opened up to permit access to the inside. The cake is normally hard and dense and must be broken up by chipping with a hammer and chisel. This invention includes a flat strip or bar 41 lying on bottom wall 13 and pivotally attached at one end by means of hole 42 in bar 41 to a U-bolt 43 affixed to bottom wall 13. The other end of bar 41 is bent to provide a vertical handle portion 44 which will extend above any possible thickness of the solid carbon deposit. By pulling upwards on handle 44 the deposit can be broken up, at least partially, so as to assist in clean out and removal.

The apparatus of this invention is particularly useful in handling the exhaust fumes of an internal combustion engine especially a diesel engine. The fumes normally contain uncombusted hydrocarbons, oil, water, air, carbon dioxide, carbon monoxide, carbon, and dust. It is most efficient and least polluting if the air, unburned gaseous fuel, and other gases are recycled to the engine cylinders for burning, so that the gaseous material which eventually is discharged to the atmosphere is as completely combusted as possible. Likewise, it it most desirable to collect the oily liquid and solid carbon deposit so they may be disposed of properly. The apparatus is most useful on large diesel engines such as found on large trucks, ships, railway engines, etc.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An apparatus for separating gas from liquid and solid matter in the exhaust from an internal combustion engine comprising:
   (A) an enclosed container for liquid and solid matter having a top wall, a bottom wall, and a side wall and having an inlet for the exhaust, a first outlet for liquid, and a second outlet for gas;
   (B) said inlet including a passageway through said side wall and a discharge port inside said container having a means for suddenly changing the direction of and for materially reducing the velocity of the exhaust being discharged through said port;
   (C) said first outlet including a passageway through said side wall with a shut off valve in said passageway;
   (D) said second outlet including a passageway through said top wall having filter means to remove entrained liquid and solid matter from the exhaust while passing therethrough with the gas passing out said second outlet, and baffle means positioned upstream of said filter means to cause substantial changes in direction of the exhaust before passing through said filter means; and
   (E) a means for selectively closing said passageway in said second outlet to raise the pressure of the exhaust in said container.

2. The apparatus of claim 1 further comprising means within said container on said bottom wall for breaking up any deposit of solid matter thereon.

3. The apparatus of claim 2 wherein said means for breaking up deposits of solid matter includes a ban engaging the inside surface of said bottom wall and pivotally fastened at one end thereof to said bottom wall and having at its free end thereof and upwardly extending handle adapted to extend above deposits of solid matter within said container.

4. The apparatus of claim 1 further comprising means for sensing liquid and solid matter level inside said container.

5. The apparatus of claim 4 wherein said means for sensing liquid and solid matter level includes a float adapted to be suspended on a surface of the liquid and solid matter collected inside said container, and mechanical linkage connecting said float to a visible indicator outside said container showing the position of said surface inside said container.

6. The apparatus of claim 4 further comprising a shut-off valve in said passageway of said inlet, said means for sensing liquid and solid matter level including a float suspended on a surface of the liquid and solid matter collected inside said container and mechanical linkage connecting said float to said shut off valve in said passageway of said inlet with a selected upper limit of said level causing said shut-off valve to be closed.

7. The apparatus of claim 4 wherein said means for sensing liquid and solid matter level includes two vertically spaced passageways through said side wall and a gauge means connected to both said passageways and providing a visual indication of said level between said two passageways and an audible alarm means when said level reaches a maximum level.

8. The apparatus of claim 1 wherein said means for selectively closing said passageway in said second outlet includes a manually held plate which is positionable over said second outlet and adapted to withstand internal pressure within said container.

9. The apparatus of claim 1 wherein said means for selectively closing said passageway in said second outlet includes a cover for said second outlet, an outlet pipe attached to said cover and communicating within said container when said cover is positioned to close the passageway, and a shut-off valve in said outlet pipe.

10. The apparatus of claim 9 further comprising a pressure relief valve communicating within said container to relieve pressure inside said container when it reaches a predetermined amount.

11. The apparatus of claim 1 wherein said means for suddenly changing direction and materially reducing velocity includes a plurality of discharge ports at right angles to said inlet passageway and an impingement wall spaced outwardly from each of said discharge ports.

12. An apparatus for separating the gaseous components from the liquid and solid components of the exhaust fumes of an internal combustion engine which comprises:
   (A) a receiving tank having a bottom wall, a generally vertical sidewall, and a top wall defining an enclosed space, an inlet passageway for exhaust fumes through the upper portion of said sidewall, a liquid outlet passageway through the central portion of said sidewall, and a gas outlet passageway through said top wall;
   (B) said inlet passageway including pipe means extending through said sidewall and having an elongated passage opening inside said tank in a plurality of laterally directed discharge ports; and an impingement wall spaced outwardly from each said discharge port and positioned laterally with respect thereto;
   (C) said liquid outlet passageway including a pipe means passing through said sidewall with a valve in the pipe means outside said tank and with an end of the pipe means inside said tank opening into a vertical tubular conduit closed at the top and open at the bottom, the bottom of said conduit being spaced above said bottom wall;

(D) said gas outlet passageway including a demister filter means for removing entrained liquid and solid components from the gas exiting through said outlet passageway and a gas flow baffle immediately upstream of said demister filter means positioned to cause said exhaust fumes to impinge thereon and sharply change flow direction before entering said demister filter means;

(E) a liquid level sensing and indicating means to provide a visible indicator outside said tank of the level inside said tank of liquid and solid components separated from the exhaust fumes; and (F) a means for breaking up a deposit of solid material disposed in said tank adjacent said bottom wall of said tank.

13. The apparatus of claim 12 in which said inlet passageway includes a valve in the pipe means outside said tank.

14. The apparatus of claim 12 wherein said pipe means includes an elongated pipe communicating with a plurality of short lengths of pipe projecting laterally outwardly from said elongated pipe defining said plurality of discharge ports for said exhaust fumes, and wherein said impingement wall includes a large diameter pipe section positioned concentrically outside of said discharge ports against which the discharge of exhaust fumes is directed.

15. The apparatus of claim 12 wherein said demister filter means includes a generally rectangular outer frame containing a central mass of crumpled metal material and screens to provide a tortuous path for said gas to flow through.

16. The apparatus of claim 15 which additionally includes a funnel shaped cover removably attachable to said top wall and having an outlet pipe with a valve in said pipe.

17. The apparatus of claim 15 which additionally includes a plate with a handle, said plate being substantially coextensive with said top wall.

18. The apparatus of claim 12 in which said liquid level sensing and indicating means includes a float adapted to ride on a surface of liquid inside said tank, and mechanical linkage connecting said float to a gauge outside said tank which provides a visible indication of the position of said surface.

19. The apparatus of claim 12 in which said liquid level and indicating means includes two vertically spaced passageways through said sidewall with a gauge connected to both passageways to provide a visible indication of the level of said liquid between said passageways.

20. The apparatus of claim 19 wherein said indicating means includes an alarm indicating when said liquid level reaches a maximum level.

21. The apparatus of claim 12 wherein said means for breaking up a deposit comprises a flat bar adapted to lie on said bottom wall and pivotably connected at one end to the inside surface of said bottom wall and provided with a handle extending upwardly therefrom to provide the capability of moving said bar so as to scrape said bottom wall.

22. The apparatus of claim 12 which additionally includes a pressure relief valve to sense the internal pressure in said receiving tank and to relieve that pressure when a selected elevated pressure is reached.

23. The apparatus of claim 12 wherein said vertical tubular conduit has a removable closure at the top to provide access for cleaning said conduit.

* * * * *